Dec. 6, 1966   R. B. PETTIBONE   3,289,603
POWER TRANSMISSION
Filed Dec. 16, 1963

INVENTOR.
RAYMOND B. PETTIBONE
BY
ATTORNEYS

United States Patent Office 3,289,603
Patented Dec. 6, 1966

3,289,603
POWER TRANSMISSION
Raymond B. Pettibone, Detroit, Mich., assignor to Sperry Rand Corporation, Troy, Mich., a corporation of Delaware
Filed Dec. 16, 1963, Ser. No. 330,729
15 Claims. (Cl. 103—136)

This invention relates to power transmissions and is particularly applicable to those of the type comprising two or more fluid pressure energy translating devices, one of which may function as a pump and another as a fluid motor.

The invention is particularly concerned with improvements in rotary fluid pressure energy translating devices, more specifically those of the sliding vane type, adapted for operating not only under high pressure conditions but in extremely high temperature applications, such as in hydraulic flight control systems for satellites, space vehicles, and nuclear power aircraft.

As these systems operate in environments exceeding 1000° F. and conventional hydraulic fluids are unsatisfactory, liquid metal as a hydraulic fluid is utilized, such as sodium potassium (NaK), an eutectic alloy of sodium and potassium, which has a low melting point, extremely high boiling point, and which is only slightly less compressible than conventional hydraulic fluids, although having low lubricity. Thus, in designing a hydraulic pump for such systems, the materials utilized for the pump must be compatible with the liquid metal, it being essential that the combination of materials utilized have favorable wear and friction characteristics when lubricated with the low lubricity liquid metal under operating conditions of high pressure and extremely high temperature.

Although this limits material selection, suitable combinations of materials are available with such favorable characteristics. A serious problem is presented, however, as temperature expansion differentials of the materials utilized must be compensated for under operating conditions of high pressure and high temperature coupled with low fluid lubricity in order to maintain the clearances, tolerances, and concentricities essential for hydraulic efficiency. For example, in a rotary sliding vane-type pump wherein the pumping elements comprise a cartridge, and, of necessity in selecting compatible materials for the liquid metal used in the high temperature system unequal expansion takes place between the housing and cartridge, a serious problem is created of maintaining the cartridge concentrically located within the housing to prevent misalignment and dislocation of the shaft, bearings, and vane carrying rotor which would contribute to a complete breakdown of the pump.

It is therefore an object of this invention to provide an improved rotary fluid pressure energy translating device adapted for high pressure and high temperature applications.

It is another object of this invention to provide an improved rotary fluid pump of the sliding vane type adapted for high pressure and extremely high temperature applications.

It is another object of this invention to provide an improved rotary pumping device capable of pumping liquid metal in high pressure and high temperature applications.

It is still another object of this invention to provide an improved rotary fluid pressure energy translating device adapted for high temperature applications having temperature compensating means for maintaining clearances and concentricities of the metallic components of the device essential for efficient pumping action.

It is a further object of this invention to provide an improved rotary fluid energy translating device having temperature compensating means adapting said device for high temperature applications, such as in hydraulic liquid metal systems, and which is compact, light in weight, efficient, and long lasting.

Further objects and advantages of the present invention will be apparent from the following description, reference being had to the accompanying drawing wherein a preferred form of the present invention is clearly shown.

Figure 1:
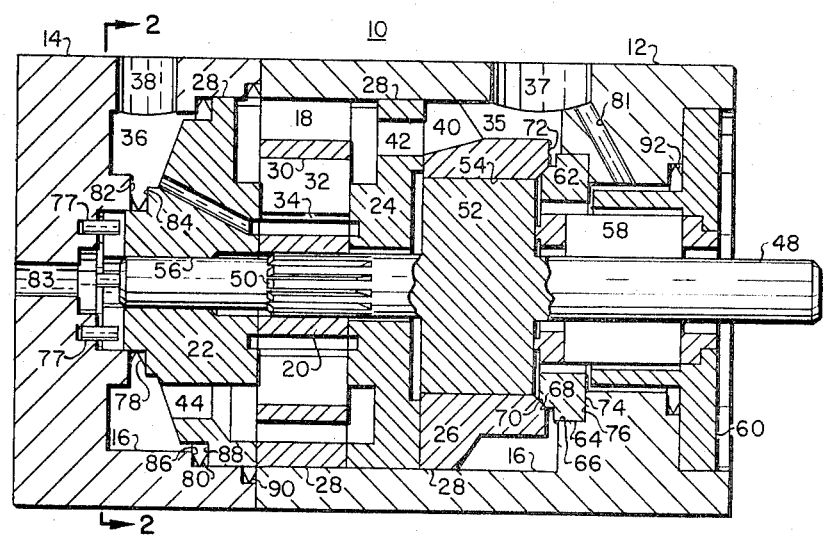
FIGURE 1 is a longitudinal sectional view of a device embodying the present invention taken on line 1—1 of FIGURE 2.

Referring now to FIGURE 1, there is shown a pump indicated generally by the numeral 10 comprising a two-section housing including a body 12 and end cover 14 suitably bolted together and having a cylindrical cavity 16 within which is mounted an axially floating pumping cartridge of the rotary sliding vane type.

The pumping cartridge comprises a cam ring member 18 within which is rotatably mounted a vane carrying rotor 20 which is sandwiched between a pressure loaded cheek plate 22 on the left side of the rotor as viewed in FIGURE 1 and on the opposite side of said rotor a wear cheek plate 24 and an inlet ported bearing plate 26 immediately adjacent wear plate 24. It should be understood that the wear cheek plate 24 and bearing plate 26 may be integrally constructed, it being preferable, however, to make them separately as shown. The pressure loaded cheek plate 22, cam ring 18, wear plate 24, and bearing plate 26 are all provided with a cylindrical outer periphery indicated generally by the numeral 28 dimensioned to provide a sliding fit within the cylindrical wall cavity 16 of the housing and end cover 14.

Axially floating pumping cartridges of the rotary sliding vane type are well known in the art and reference may be made to Patent No. 2,544,987 to Duncan B. Gardiner et al. for a description and explanation of the dual inlet porting of the cheek wear plate, the dual outlet porting of the pressure loaded plate and the diametrically opposed inlet and outlet pumping chambers formed between the outer periphery of the rotor and the inner periphery of the cam ring. In such devices, the internal periphery 30 of the cam ring 18 forms a two-lobed vane track against which the outer ends of the vane 32 slidably mounted in slots 34 of the rotor 20 engage. Two diametrically opposed inlet pumping chambers and two diametrically opposed outlet pumping chambers are formed between the outer periphery of the rotor and the two-lobed vane track. In the present device, two chambers are also formed at opposite ends of the cavity within the vicinity of the bearing and pressure loaded cheek plates, one of which at the bearing plate end is an inlet chamber 35 connected to an inlet port 37 and the other of which at the pressure plate end of the cartridge is a combined delivery and pressure chamber 36 to which is connected an outlet port 38.

The bearing plate 26 is provided with two diametrically opposed inlet ports 40 which are formed by cutting sections from the outer periphery radially inward and which extend axially completely therethrough and register with two diametrically opposed inlet ports 42 of the wear plate 24 also extending completely axially therethrough which register with the two diametrically opposed inlet pumping chambers formed at the periphery of the rotor of the device and through which the outer ends of the vanes pass as the rotor turns. Only one inlet port of the bearing and wear plates is shown. The pressure plate 22 is provided with two diametrically opposed outlet ports 44 and 45 shown more clearly in FIGURE 2 which extend through the plate and register on one side with the two diametrically opposed outlet pumping chambers at the periphery of the rotor of the device and which open at their other side to the combined delivery and pressure chamber 36.

Figure 2:
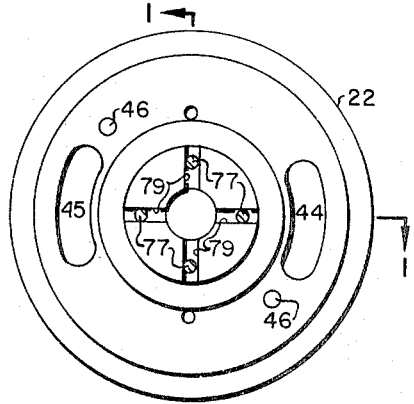
FIGURE 2 is a sectional view on line 2—2 of FIGURE 1.

For the purpose of originally establishing and for maintaining proper alignment of the respective elements of the pumping cartridge and preventing relative rotation of such elements, the pressure plate 22, ring 18, wear plate 24, and bearing plate 26 are dowelled to each other by dowel pins 46, shown in FIGURE 2.

A shaft 48 is operatively spline connected to the rotor at 50 and is provided with an enlarged section 52 rotatably journalled in a bore 54 of the bearing plate 26. The extreme left end of shaft 48 is also rotatably journalled in a bore 56 of pressure plate 22. Proper sealing at the end of the housing from which the shaft extends is provided by a shaft seal assembly comprising a metallic bellows type seal 58 surrounding shaft 48 which is mounted in a flanged combined retainer and guide member 60 suitably bolted at its flanged portion to the housing 12.

In conventional rotary sliding vane pumps of the axially floating cartridge type, it has been the practice to pressure actuate the complete cartridge by means of outlet pressure imposed on the exposed surface of the pressure plate in the opposite direction into engagement with an end wall in the cavity of the device. In order to compensate for both axial and radial differentials in the expansion gradients of the housing and cartridge elements, hereinafter to be explained, the present device differs from conventional devices in the provision of a compensator ring member 62 supported on its outer periphery 64 in a stepped bore portion 66 of the housing cavity 16. The compensator ring member 62 is provided with a chamfered or frustoconical cam portion 68 which engages a complementary chamfered or frustoconical cam portion 70 on an outer face 72 of the bearing plate 26. The inner face 74 of ring member 62 is maintained in engagement against a shoulder 76 of step bore 66. Outlet pressure in outlet chamber 36 acting on the exposed outer face of pressure plate 22 urges the inner face of pressure plate 22 into engagement with the ring member 18, the ring member 18 into engagement with the inner face of wear cheek plate 24, the outer face of cheek plate 24 into engagement with the inner face of bearing plate 26 and the cam portion 70 of bearing plate 26 into engagement with the cam portion 68 of ring member 62. There is, of course, proper running clearance provided between the plane inner face of the pressure and wear plates and the opposite plane side faces of the rotor.

Radial expansion at the opposite or pressure plate end of the device is adapted to be compensated for by means of four equally spaced dowel pins indicated generally by the numeral 77 pressed into housing cover 14 which engage elongated slots 79 in the adjacent plate 22. These pins also serve to prevent rotation of the cartridge when torque is applied.

The pump contains a path for circulating system fluid through the bearings to cool the load supporting surfaces and to remove loose wear particles. The circulation path begins with the pump inlet through a drilled passage 81 in the housing 12 connected to inlet port 37, through clearances between the shaft journals and bearings, the shaft and rotor splines, and through an external drain 83 located in the cover 14.

Figure 3:
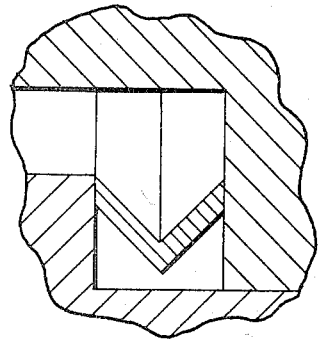
FIGURE 3 is an enlarged fragmentary view illustrating a seal utilized in the device shown in FIGURE 1.

Some resilient loading of the cartridge to establish a sliding fit engagement of the respective conical portions of the cartridge and the compensator ring member is provided by suitable metallic V-shaped spring seal members 78 and 80 shown more clearly in FIGURE 3. One arm of spring seal member 78 engages an end wall 82 of the cavity 16 within the cover 14 and the other arm thereof engages a stepped hub portion 84 of pressure plate 22 while the arms of spring seal member 80 engage a shoulder 86 of cavity 16 within cover 14 and a shoulder 88 of pressure plate 22. These seals have sufficient flexibility to maintain proper sealing at areas around the delivery chamber when relative expansion between the cartridge and housing takes place. A similar type of seal 90 is placed between the housing 16 and cover 14 in a groove of the cover member and also one indicated by the numeral 92 between the inner face of the flanged guide member 60 and housing 12 on a shoulder ledge of said housing.

Where the device is to be incorporated in a high temperature system for pumping liquid metal, materials for the device must be selected which are compatible with the liquid metal being pumped and which also have other favorable characteristics required in conventional devices of this type. As the housing and cartridge elements will of necessity be constructed of different materials, there will, therefore, be a difference in co-efficients of temperature expansion of the different materials in the cartridge and housing which unless compensated for both axially and radially, will contribute to a complete breakdown and failure of the pump. Thus, if the housing expands more than the cartridge, the original clearance between cartridge and cavity is increased and creates a gap which must be sealed particularly at or near the discharge chamber of the device, for which the metallic V-type seals are adapted to compensate. Proper engagement of the respective elements of the pumping cartridge and maintenance of proper running clearances are assured by axial pressure loading of the cartridge aided to some extent by seals 78 and 80. More important, as the journal bearings 26 and 22 in which the shaft is supported are originally supported at their periphery in the housing, the concentric location of the cartridge and journal bearings relative to the pump housing would be disturbed. The provision of the compensator ring 62 is adapted to solve this problem by holding the cartridge assembly concentric to the drive axis, the slot and pin arrangement at the opposite extremity of the device permitting relative radial expansion of the housing with the cartridge.

Thus, if a liquid metal, such as NaK, is utilized in the high temperature system, the cartridge elements and the shaft may be made of tungsten carbide and the housing and compensator ring member 62 of a nickel base alloy known as Rene-41. In such case, because the housing and compensator ring expand at a higher rate than the cartridge and shaft, the cartridge is moved forward by a wedge type action of the compensator ring on the wear plate a distance proportional to the cosine of the chamfer angle while radial concentrictiy is maintained. Although total axial elongation of the housing and cover recess or cavity 16 is not completely compensated for, this does permit the V-shaped metallic seals to operate within prescribed compression ratings. As the compensator ring 62 is made of the same material as the housing 12 and cover 14 and expands therewith, and as the shaft 48 is journalled at 52 in the bearing plate 26 which is maintained in a sliding fit engagement at its conical portion 70 with the conical portion 68 of the compensator ring 62, axial expansion of the cavity 16 is not only substantially compensated for but the cartridge elements are held in their originally located concentric location relative to the driving axis and the housing.

It should be noted that the housing and compensator ring may be made of a material such as molybdenum which will expand less under high temperature than the cartridge elements and the shaft which is the reverse of the situation when the housing is made of Rene-41. The differential in expansion between such materials is, however, much less than between tungsten carbide and Rene-41. In such case, the original clearances between cartridge and cavity will be slightly increased. The metallic V-shaped seals will be depended upon to maintain proper sealing at or around the discharge chamber of the pump and the cartridge elements although expanding slightly more in relation to the housing will be held concentric with the housing by means of the wedge action and sliding engagement between the conical surfaces of the compensator ring and bearing plate. Maintenance of proper alignment and concentricity is also aided by the pin and slot arrangement between the cover and pressure plate.

While the form of embodiment of the invention as herein disclosed constitutes a preferred form, it is to be understood that other forms might be adopted, all coming within the scope of the claims which follow.

What is claimed is as follows:

1. A fluid energy translating device comprising: a housing having a cavity; a cartridge assembly axially floatable in said cavity comprising a rotor operatively connected to a shaft extending from said housing and two plate members on opposite sides of said rotor, said shaft being rotatably journalled in said plate members, one of said plate members having a cam surface portion on one face thereof; means forming a complementary cam surface portion in one end wall of the housing cavity, said housing having a different co-efficient of temperature expansion than said cartridge elements and shaft; and means continuously urging said cartridge toward said end wall to maintain a sliding fit engagement between the complementary cam surfaces of the plate member and the cavity end wall, said sliding engagement complementary cam surfaces, upon relative expansion of said housing with the cartridge assembly, maintaining by wedging action the original concentric location of the cartridge assembly relative to the shaft axis and the housing.

2. A fluid energy translating device as defined in claim 1 and having a plurality of pin members stationed at one end thereof in the other end wall of said cavity and extending at their other ends axially into radially extending slots formed in said other plate member, said pin members preventing rotation of the cartridge assembly relative to the housing but being slidable radially in said slots to compensate for relative radial expansion of said housing and the cartridge assembly.

3. A fluid energy translating device as defined in claim 1 wherein the cam surface of the plate member is formed on a separate compensator member mounted in the end wall of the cavity, the compensator member being made of the same material as the housing.

4. A fluid energy translating device as defined in claim 1 wherein pumping mechanism is located between the two plate members which comprises a cam ring, the interior periphery of which forms a vane track, and a rotor carrying a plurality of radially sliding vanes, the outer ends of which are adapted to engage the vane track.

5. A fluid energy translating device as defined in claim 1 wherein the means urging said cartridge to maintain a sliding fit engagement between the complementary cam surfaces of the plate member and the cavity end wall comprises resilient means engaging the other end wall of the cavity and the other plate of said cartridge, and a high pressure chamber adjacent said other plate of said cartridge for pressure actuation of the entire cartridge towards and into engagement with the cam surface of the said one end wall of the cavity.

6. A fluid energy translating device comprising: a housing having a cavity; a pumping cartridge axially floatable in said cavity comprising a rotor carrying a plurality of radially sliding vanes within a vane track member, a pressure loaded cheek plate on one side of said rotor and vane track member, and a cheek wear plate and a bearing plate on the opposite side of said rotor and vane track member, said bearing plate having a frustoconical cam surface portion facing one end wall of said cavity; a shaft operatively connected to said rotor extending from said housing and rotatably journalled in said bearing plate and said pressure loaded cheek plate; means forming a complementary frustoconical cam surface in the said cavity end wall facing the cam surface of the bearing plate, said pumping cartridge elements and shaft being made of a material having a different co-efficient of temperature expansion than the material of said housing; and means urging said cartridge towards said one end wall and maintaining a sliding fit engagement of the frustoconical cam surfaces of the bearing plate and cavity end wall, original concentricity of the cartridge relative to the housing and the shaft axis being maintained upon relative expansion of the cartridge and housing elements by a wedging action between the slidably engaging frustoconical cam surfaces.

7. A fluid energy translating device as defined in claim 6 and having a plurality of pins, the opposite ends of which are respectively stationed in the other end wall of the cavity and extend axially into radial slots of the pressure plate, said pins being slidable radially in said slots for permitting relative radial expansion of the cartridge and housing.

8. A fluid energy translating device as defined in claim 6 wherein the frustoconical surface engaging the rrustoconical surface of the bearing plate is formed on a separate temperature expansion compensator member mounted in the end wall of the cavity and made of the same material as the housing.

9. A fluid energy translating device as defined in claim 6 and wherein the cartridge elements and shaft are made of a material which expands more under high temperature than the housing material.

10. A fluid energy translating device as defined in claim 6 and wherein the cartridge elements and shaft are made of a material which expands less under high temperature than the housing material.

11. A pump for pumping liquid metal under high temperature comprising: a housing having a cavity; a pumping cartridge axially floatable in the cavity including a bearing plate; a shaft operatively connected to a pumping element of the pumping cartridge and extending from the housing, said shaft being rotatably journalled in the bearing plate; means forming a cam surface on the bearing plate and a complementary cam surface in an end wall of the cavity, said pumping cartridge, shaft, and housing being made of materials compatible with the liquid metal being pumped and the pumping cartridge and shaft material having a different co-efficient of temperature expansion than the housing material; and means urging the pumping cartridge toward the said cavity end wall and the cam surface of the pumping cartridge bearing plate into a sliding fit engagement with the cam surface of the end wall of the cavity, relative axial and radial expansion between the housing and pumping cartridge being compensated for to maintain concentricities by wedging action between the engaging sliding fit cam surfaces.

12. A pump as defined in claim 11 wherein the pumping cartridge includes a pressure loaded cheek plate on the side of the pumping element opposite to that of the bearing plate, and a plurality of pins, the opposite ends of which are respectively stationed in the other end wall of the cavity and extend axially into radial slots of the cheek plate for preventing rotation of the cartridge relative to the housing, said pins being slidable radially in said slots for permitting relative radial expansion of the housing and pumping cartridge.

13. A fluid energy translating device as defined in claim 12 and wherein the shaft is rotatably journalled in both the bearing plate and cheek plate, and a high pressure chamber is formed immediately adjacent the cheek plate for pressure actuation of the entire cartridge towards the cam surface of the cavity end wall.

14. A fluid energy translating device as defined in claim 13 and having in addition resilient means engaging the other end wall and pressure loaded cheek plate for resiliently urging the pumping cartridge into engagement with the cam surface of the said one end wall.

15. A pump as defined in claim 11 wherein complementary frustoconical cam surfaces are formed on the bearing plate and the end wall of the housing cavity.

References Cited by the Examiner

UNITED STATES PATENTS

| | | | |
|---|---|---|---|
| 1,896,508 | 2/1933 | Brown | 253—39 |
| 2,466,602 | 4/1949 | Lombard et al. | 253—39 |
| 2,872,873 | 2/1959 | Gardiner | 103—136 |
| 2,924,182 | 2/1960 | Blasutta | 103—136 |
| 2,962,256 | 11/1960 | Bishop | 253—39 |

MARK NEWMAN, *Primary Examiner.*

DONLEY J. STOCKING, *Examiner.*

R. M. VARGO, *Assistant Examiner.*